US006522868B1

(12) United States Patent
Stilwell

(10) Patent No.: US 6,522,868 B1
(45) Date of Patent: Feb. 18, 2003

(54) METHOD AND APPARATUS FOR GENERATING A COMMUNICATION BAND SIGNAL WITH REDUCED PHASE NOISE

(75) Inventor: Gregory W. Stilwell, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/227,831

(22) Filed: Jan. 11, 1999

Related U.S. Application Data

(63) Continuation-in-part of application No. 09/185,579, filed on Nov. 4, 1998, now Pat. No. 6,442,374.

(51) Int. Cl.[7] ............................ H04B 1/40; H04B 17/02

(52) U.S. Cl. ........................... 455/76; 455/73; 455/216; 455/260

(58) Field of Search ................................ 455/260, 264, 455/265, 259, 76, 208, 209, 216, 222, 255, 257, 258; 331/172, 25, 16; 375/376, 327

(56) References Cited

U.S. PATENT DOCUMENTS 4,070,635 A * 1/1978 Healey, III ................... 331/19
5,065,408 A * 11/1991 Gillig .......................... 455/76
5,363,419 A * 11/1994 Ho ............................. 331/1 A
5,621,771 A * 4/1997 Dvir ............................ 455/76
5,740,521 A * 4/1998 Hulkko et al. ................ 455/76
5,748,047 A * 5/1998 Guthrie et al. .............. 455/260
5,790,959 A * 8/1998 Scherer ...................... 455/561
5,825,254 A * 10/1998 Lee ............................. 455/76
5,844,939 A * 12/1998 Scherer et al. ................ 455/76
5,886,752 A * 3/1999 Cross ......................... 375/300
5,903,196 A * 5/1999 Salvi et al. .................... 331/16
5,940,457 A * 8/1999 Dreifuss et al. ............ 375/376

OTHER PUBLICATIONS

A Completley Integrated Single–Chip PLL with a 34 GHz VCO Using 0.2um E–/D–HEMT–Technology, 1997.*

* cited by examiner

*Primary Examiner*—William Trost
*Assistant Examiner*—Simon Nguyen
(74) *Attorney, Agent, or Firm*—Burns, Doane, Swecker and Mathis, LLP

(57) ABSTRACT

The present invention is directed to providing a local oscillator suitable for use in a communication system capable of providing actual wireless transmission rates on the order of 125 Mb/s, or higher, with relatively high transmission power on the order of 0.5 to 2 watts (W) or higher, with a high signal-to-noise(S/N) ratio, a bit error rate on the order of $10^{-12}$ or lower, 99.99% availability, and with relatively simple circuit designs. Exemplary embodiments can provide these features using a compact and efficient, low distortion local oscillator for use in a transceiver design based on high power (e.g., 0.5 W) monolithic millimeter wave integrated circuits (MMICs), having a compression point which accommodates high speed modems such as OC-3 and 100 Mb/s Fast Ethernet modems used in broadband networking technologies like SONET/SDH (e.g., SONET ring architectures having self-healing ring capability). By applying high power MMIC technology of conventional radar systems to wireless duplex communications, significant advantages can be realized. Exemplary embodiments have transmit operating frequencies in a fixed wireless spectrum of 18–40 GHz or wider, and produce a power output on the order of 0.5 W to 2 W or more, with a relatively simple circuit design.

24 Claims, 2 Drawing Sheets

METHOD AND APPARATUS FOR GENERATING A COMMUNICATION BAND SIGNAL WITH REDUCED PHASE NOISE

RELATED APPLICATIONS

The present application is a continuation-in-part of U.S. Application Ser. No. 09/185,579, filed Nov. 4, 1998, now U.S. Pat. No. 6,442,374, and entitled: METHOD AND APPARATUS FOR HIGH FREQUENCY WIRELESS COMMUNICATION, the disclosure of which is hereby incorporated by reference in its entirety.

BACKGROUND OF THE INVENTION

1. Field of the Invention

The present invention relates generally to communication systems and methods, and more particularly, to an exciter which can generate a communication band low-noise signal.

2. State of the Art:

Communication systems which employ wireless transceivers are well known. However, as is the case with most electronic technologies today, there is an ever increasing demand to improve information transmission rates and range (that is, power output), while at the same time, reducing the influence of noise and improving the quality of transmission. In addition, there is always increasing demand to broaden the applicability of wireless communications to technologies still dependent on wired or fiber linked communication, such as mainframe-to-mainframe communications where high data rate and high power requirements have precluded the use of conventional wireless communications. To satisfy these competing concerns, a compromise is often reached whereby some sacrifice in transmission rate is accepted to enhance the integrity of the data transmitted. In addition, some sacrifice in transmission range is accepted to reduce the transceiver's circuit complexity and cost.

One feature of conventional communication systems which affects information transmission rates and range is the exciter used for information transmission and reception. Although a wide variety of exciters are known for general information transmission/reception, the availability of exciters appropriate for use in high power, high transmission rate systems is limited. Moreover, the exciters which may be useful for such applications do not exhibit high phase-noise performance or, can only achieve an acceptable phase-noise performance characteristic using a high cost, complex exciter circuit arrangement which would be impractical from size and cost efficiency standpoints.

Accordingly, it would be desirable to provide an apparatus and method for generating a communication band low-noise signal using a simplistic, cost effective approach that can satisfy system constraints of high power (e.g., on the order of 0.5 to 2 watts (W) or higher), high signal-to-noise (S/N) ratio, accommodate operating frequencies on the order of 18–40 Gigahertz (GHz) spectrums or wider, and actual transmission rates on the order of 100 to 125 Megabits per second (125 Mb/s), or higher.

SUMMARY OF THE INVENTION

The present invention is directed to providing a local oscillator suitable for use in a communication system capable of providing actual wireless transmission rates on the order of 125 Mb/s, or higher, with relatively high transmission power on the order of 0.5 to 2 watts (W) or higher, with a high signal-to-noise(S/N) ratio, a bit error rate on the order of $10^{-12}$ or lower, 99.99% availability, and with relatively simple circuit designs. Exemplary embodiments can provide these features using a compact and efficient, low distortion local oscillator for use in a transceiver design based on high power (e.g., 0.5 W) monolithic millimeter wave integrated circuits (MMICs), having a compression point which accommodates high speed modems such as OC-3 and 100 Mb/s Fast Ethernet modems used in broadband networking technologies like SONET/SDH (e.g., SONET ring architectures having self-healing ring capability). By applying high power MMIC technology of conventional radar systems to wireless duplex communications, significant advantages can be realized. Exemplary embodiments have transmit operating frequencies in a fixed wireless spectrum of 18–40 GHz or wider, and produce a power output on the order of 0.5 W to 2 W or more, with a relatively simple circuit design.

In addition, exemplary embodiments achieve a design compactness with an exciter design that can be employed for both the transmitter and receiver. As such, the present invention has wide application including, for example, point-to-point wireless communications between computers, such as between personal computers, between computer networks and between mainframe computers, over broadband networks with high reliability.

Generally speaking, exemplary embodiments of the present invention are directed to a method and apparatus for generating a communication band low-phase noise signal, comprising: a voltage controlled oscillator for producing an output frequency from a reference frequency; and means for producing any one of multiple frequency outputs of at least approximately 18 GHz with an integrated phase noise of no greater than approximately −40 dB, each of said multiple frequency outputs being separated from an adjacent frequency by a channel step size of at least one MHZ.

BRIEF DESCRIPTION OF THE DRAWINGS

Other objects and advantages of the present invention will become apparent to those skilled in the art upon reading the following detailed description of preferred embodiments, in conjunction with the accompanying drawings, wherein like reference numerals have been used to designate like elements, and wherein.

DETAILED DESCRIPTION OF THE PREFERRED EMBODIMENTS

Figure 1:
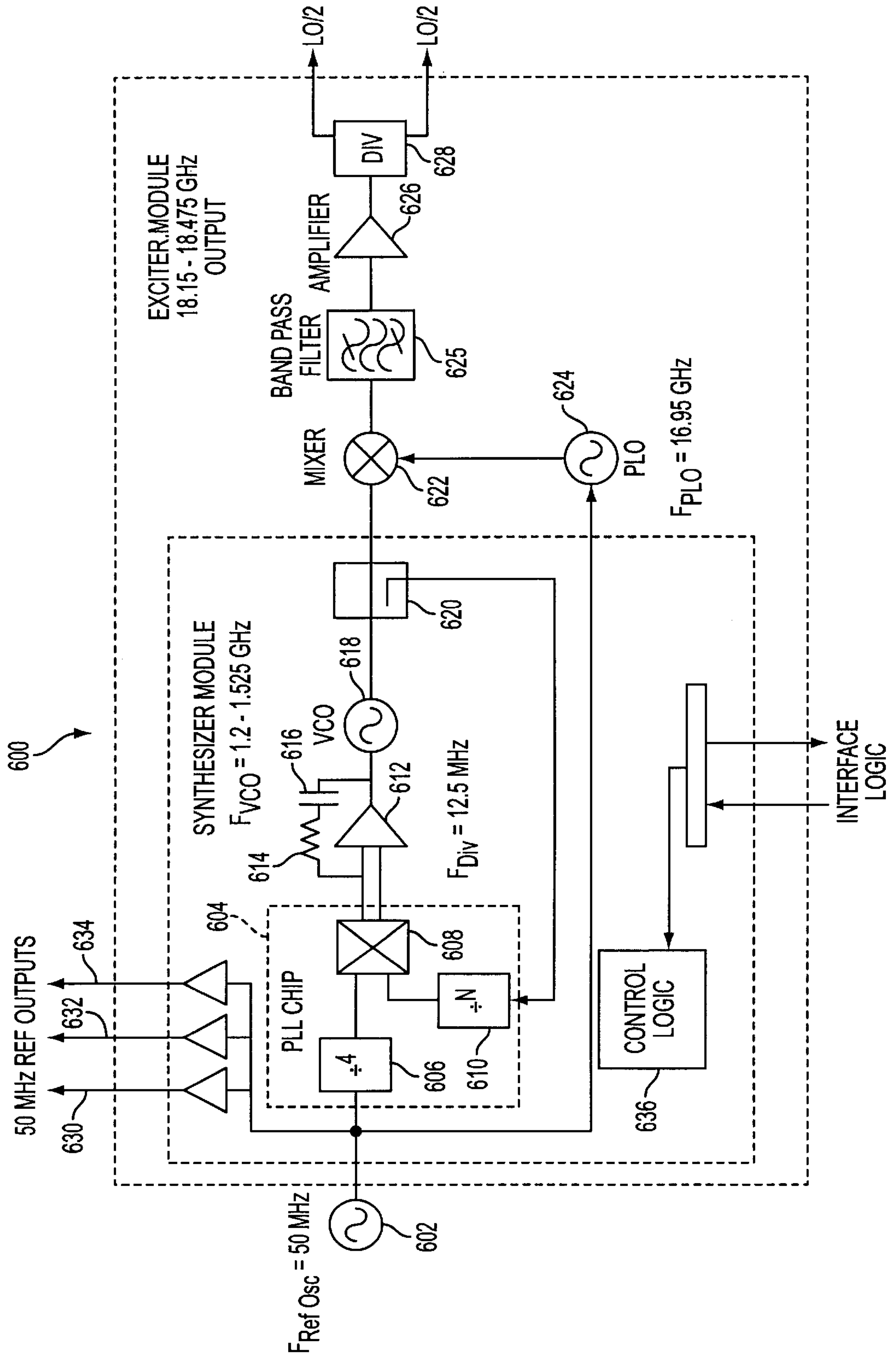
FIG. 1 shows an exemplary embodiment of an exciter in accordance with the present invention.

FIG. 1 shows an exemplary embodiment of the present invention, wherein an exciter is configured as a local oscillator which receives a reference input frequency of, for example, 50 MHz and a reference input power of 10 dB minimum. The reference input frequency is provided via a phase locked oscillator which can be coherent with a reference oscillator of the system in which the exciter is used. A synthesized output frequency of the exciter is, for example, on the order of 1.2 to 2.525 GHz using 14 channels with 25 MHz step sizes (i.e., spacing) between adjacent channels, or any other desired frequency and/or spacing.

The local oscillator output can be frequency divided into two channels to provide two outputs, each designated LO/2, having a frequency on the order of 18 GHz (e.g., 18.15 to 18.475 GHz), using a predetermined number of channels (e.g., 14 channels) wherein the frequencies of adjacent channels are spaced by a channel step size of at least one MHz (e.g., 25 MHz spacing). The output power level for the LO/2 output is on the order of 10 to 16 dB, and can be buffered by a saturated amplifier. Exemplary single sideband phase noise for each LO/2 output can, for example, be an integrated phase noise of no greater than −40 dBc. For example, in a single sideband phase noise-frequency plot, phase noise is as follows: −88 dBc/Hz at 100 Hz, −98 dBc/Hz at 100 kHz, −103 dBc/Hz at 10 kHz, −105 dBc/Hz at 100 kHz, and −108 dBc/Hz at 1 MHz. Exciter output port-to-port isolation can be, for example, 20 dB or any other specified isolation. Exciter spurious and harmonic outputs can be on the order of −70 dBc. The exciter output frequency tolerance can be on the order of ±0.6 parts per minute (ppm), and the frequency switching time can be on the order of 1 millisecond. Of course, these values can be varied as desired.

The FIG. 1 exciter is labeled 600 and includes a 50 MHz input from a frequency reference oscillator 602. This reference oscillator frequency is supplied to a phase lock loop chip (PLL chip) 604 where it is frequency divided (e.g., divided by four) via a divider 606, and supplied to a multiplexer 608. The multiplexer 608 receives a feedback signal of a phase locked loop feedback path via an N divider 610 wherein the divide ratio is selected to be a minimum (e.g., N=4). A divide ratio of at least one of the divider 606 and the divider 610 is selected to provide a desired channel step size. Outputs from the multiplexer 608 are supplied to an integrator configured, for example, as an amplifier 612 with a feedback path that includes a resistor 614 and capacitor 616.

The output from amplifier 612 is used to drive a voltage controlled oscillator 618 to produce a synthesized output frequency on the order of $F_{vco}$ of 1.2 to 1.525 GHz. The output from the VCO 618 is supplied via a feedback path 620 of a phase locked loop to the divider 610. The output from the VCO is also supplied to an upconverter using a mixer 622 which receives a second input from a phase locked oscillator 624 having a frequency on the order of 16.95 GHz. The oscillator 624 of the upconverter is also driven by the frequency reference oscillator 602 and is used to up-convert the frequency output of the voltage controlled oscillator 618 via the mixer 622.

An output from the mixer 622 is supplied via bandpass filter 625 and an amplifier 626 to a divider 628 to provide the exciter outputs designated LO/2, in two separate channels, each channel having an exemplary output frequency on the order of 18.15 to 18.475 GHz. 50 MHz reference outputs 630, 632 and 634 can also be provided from the reference oscillator 602. Control logic 636 can be configured in any conventional fashion to interface operation of the exciter with a system in which the exciter is employed (e.g., with a transmitter and/or receiver of continuous wave, full duplex communication systems).

Figure 2:
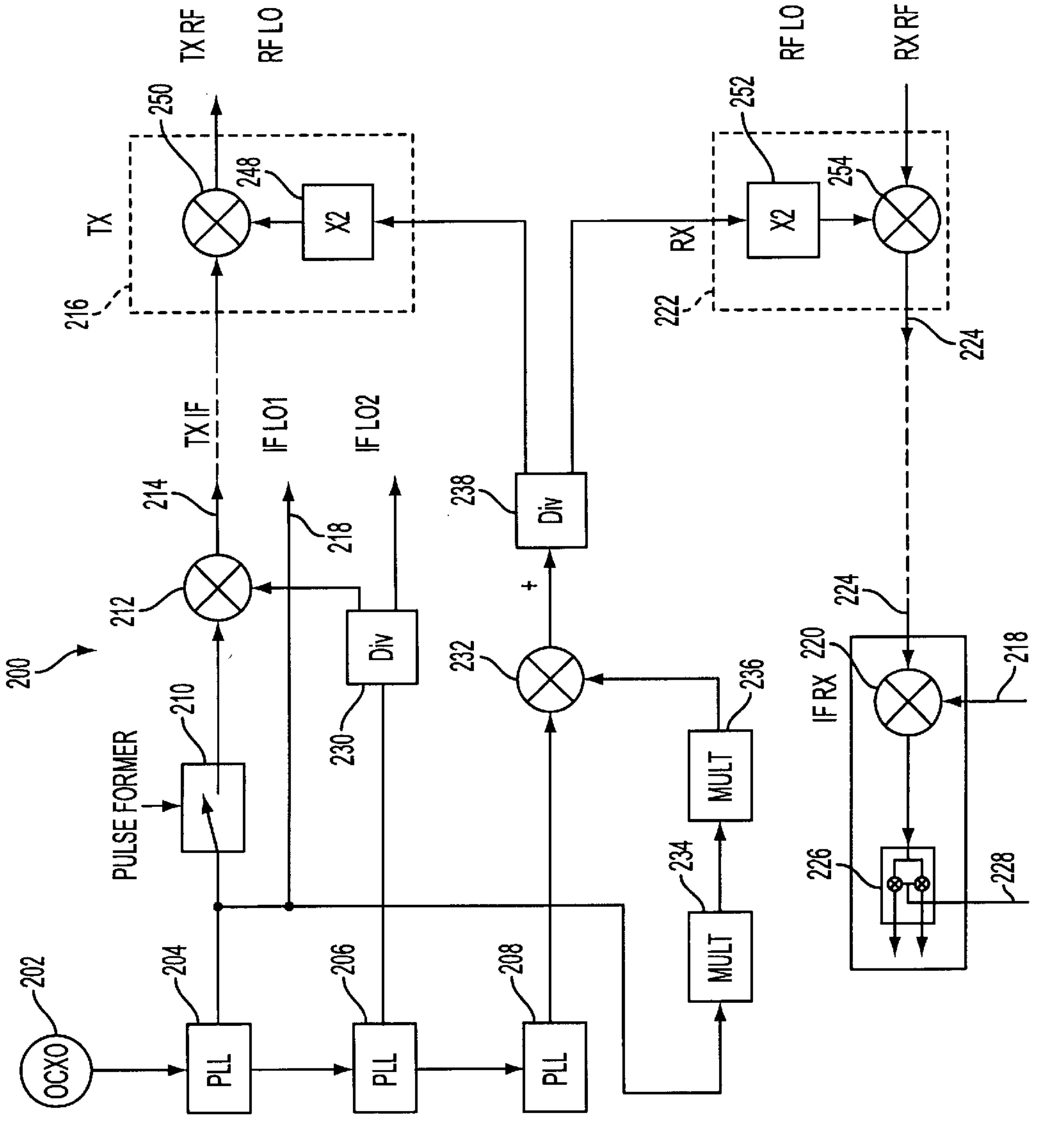
FIG. 2 illustrates an alternate exemplary embodiment of the present invention wherein a phase locked loop of the FIG. 1 embodiment is eliminated, and in which intermediate frequencies for use in a transmitter/receiver are generated using a pulse former suitable for radar applications.

FIG. 2 illustrates an alternate exemplary embodiment of the present invention suitable for pulsed communications (e.g., radar applications). The FIG. 2 embodiment eliminates the phase locked oscillator of FIG. 1, and adds additional functionality. For example, this additional functionality includes generating a transmitter intermediate frequency using a pulse former. As with the exemplary FIG. 1 embodiment, the FIG. 2 embodiment minimizes the divide ratio to achieve a desired channel step size among adjacent frequencies produced at an output of the local oscillator.

The FIG. 2 embodiment includes features similar to those of FIG. 1. For example, the FIG. 2 embodiment includes a frequency reference oscillator 202. The reference oscillator frequency is supplied to any number of phase locked loops (e.g., phase lock loop chips) 204, 206 and 208, all of which are phase locked to the frequency reference oscillator 202. Each of the phase lock loops 204, 206 and 208 can be configured similar to the phase lock loop chip of FIG. 1, and include a frequency divider for dividing the reference oscillator frequency by a divide ratio.

In an exemplary embodiment, the reference oscillator frequency is 30 MHz. The phase lock loop 204 is configured with a 2.4 GHZ output frequency, a reference divide ratio of 3, a reference frequency of 10 MHz, and a divide ratio of 240. The exemplary phase lock loop 206 is configured with a 0.24 GHz output frequency, a reference divide ratio of 3, a reference frequency of 10 MHz and a divide ratio of 24. The phase locked loop 208 is configured with a 1.455 GHz frequency, a reference divide ratio of 8, a 3.75 MHz reference frequency and a divide ratio of 388.

An output of the phase lock loop 204 is supplied to a pulse former 210. An output of the pulse former 210 is supplied to a mixer 212 for producing a pulsed intermediate frequency output 214. The pulsed intermediate frequency output can be supplied as the intermediate frequency of, for example, a transmitter as described in the aforementioned copending application Ser. No. 09/185,579.

The input to the pulse former 210 can also be used as a local oscillator intermediate frequency output 218 designated "IF ILO1" for demodulating signals in a receiver as described in the aforementioned copending application. The intermediate frequency output 218 of the local oscillator can be supplied to a mixer 220 of a demodulator in a receiver 222. The mixer 220 receives a second input from the receiver 222 via a signal path 224. An output from the mixer 220 can be supplied to a demodulating circuit 226 that receives a second local oscillator signal designated "IF L02" via a signal path 228. The signal path 228 is received from a divider 230 connected to the phase locked loop 206. Another output of the divider 230 is supplied as a second input to the mixer 212.

As mentioned previously, the phase lock oscillator 624 of the FIG. 1 embodiment has been eliminated in the FIG. 2 embodiment. In place thereof, an output from the phase lock loop 208 is supplied to a mixer 232 as a first input. A second input to the mixer 232 is the output of phase locked loop 204. In the exemplary FIG. 2 embodiment, the output from phase lock loop 204 which is supplied to the mixer 232 has been doubled via a frequency multiplier 234 and then tripled in a multiplier 236.

An output of the mixer 232 is supplied to a divider 238 for generating local oscillator outputs that can be used in the transmitter 216 and the receiver 222. In an exemplary embodiment, the divider 238 produces two local oscillator outputs having a frequency which is a function of the divide ratio included in the phase locked loop 208. For example, where the phase locked loop 208 has low, middle and high bands of 1.455 GHz, 1.695 and 1.935 GHz, respectively, and associated divide ratios of 388, 452 and 516, respectively, the local oscillator outputs can be 15.855 GHz, 16.095 GHz, and 16.335 GHz, respectively.

The output from the divider 238 is supplied to transmitter and/or transceiver components as described in the co-pending application. This is generally illustrated in FIG. 2, wherein a first output of the divider 238 is supplied via a frequency doubler 248 to a second input of a mixer 250 that also receives the transmitter frequency via the pulsed intermediate frequency output 214. The output of the mixer 250 can be a transmitter radio frequency signal constituted by a pulsed signal having (that is, for the exciter frequencies described with respect to FIG. 2) a frequency of, for example, 34.35 GHz, 34.83 GHz, or 35.31 GHz, depending on the local oscillator frequency.

The second output from the divider 238 is supplied to a frequency doubler 252 of the receiver 222. An output of the frequency doubler 252 is supplied to a mixer 254 which receives a pulsed receive signal, such as a reflection pulse due to the transmitter pulses having been returned from a target surface. An output from the mixer is supplied via the signal path 224 to the mixer 220 of the demodulator. In an exemplary embodiment, an output frequency of the frequency multiplier 252 corresponds to that of the output from frequency doubler 248.

The exemplary embodiments of FIGS. 1 and 2 are intended to be illustrative only, and the present invention is not limited by the exemplary embodiments specifically described herein. For example, the divide ratio of the divider 110 in the FIG. 1 embodiment can be set to any desirable ratio to achieve the desired number of multiple exciter outputs with acceptable channel spacing and phase noise. The value of 4 has been set in accordance with exemplary embodiments of the present invention by way of example only.

The phase locked loop used in conjunction with the FIG. 1 embodiment can be implemented using any available phase locked loop chip, such as those available from Qualcomm, Inc. of San Diego, Calif., or any other suitable phase locked loop. In an exemplary embodiment, the voltage controlled oscillator 618 of the FIG. 1 embodiment uses 14 channels with 35 GHz spacing between adjacent output frequencies, such as 14 channels ranging from 1.200 GHz up to 1.525 GHz to produce local oscillator output frequencies in each of two LO/2 channels ranging from 18.150 GHz to 18.475 GHz. The divide ratio used can be selected using the following exemplary table as a guide wherein: "N" is the divide ratio of divider 610 which can, for example, be a Qualcomm 3230 divide chip available from Qualcomm, Inc. of San Diego, Calif., having a counter and an overflow counter to control the divide function in response to select inputs. The values of "M" and "A" in the following table are used as the select inputs to the divider 610 from control logic 636 to select one of the divide ratios:

| Channel | $F_{VCO}$ | $F_{LO/2}$ | N | 20LOG(N) | M | M(Binary) | A | A(Binary) | $F_{LO}$ | $F_{RF\ FWD}$ | $F_{FR\ REV}$ |
|---|---|---|---|---|---|---|---|---|---|---|---|
| 1 | 1.200 | 18.150 | 96 | 39.6 | 8 | 1000 | 6.0 | 0110 | 36.30 | 38.625 | 39.325 |
| 2 | 1.225 | 18.175 | 98 | 39.8 | 8 | 1000 | 8.0 | 1000 | 36.35 | 38.675 | 39.375 |
| 3 | 1.250 | 18.200 | 100 | 40.0 | 9 | 1001 | 0.0 | 0000 | 36.40 | 38.725 | 39.425 |
| 4 | 1.275 | 18.225 | 102 | 40.2 | 9 | 1001 | 2.0 | 0010 | 36.45 | 38.775 | 39.475 |
| 5 | 1.300 | 18.250 | 104 | 40.3 | 9 | 1001 | 4.0 | 0100 | 36.50 | 38.825 | 39.525 |
| 6 | 1.325 | 18.275 | 106 | 40.5 | 9 | 1001 | 6.0 | 0110 | 36.55 | 38.875 | 39.575 |
| 7 | 1.350 | 18.300 | 108 | 40.7 | 9 | 1001 | 8.0 | 1000 | 36.60 | 38.925 | 39.625 |
| 8 | 1.375 | 18.325 | 110 | 40.8 | 10 | 1010 | 0.0 | 0000 | 36.65 | 38.975 | 39.675 |
| 9 | 1.400 | 18.350 | 112 | 41.0 | 10 | 1010 | 2.0 | 0010 | 36.70 | 39.025 | 39.725 |
| 10 | 1.425 | 18.375 | 114 | 41.1 | 10 | 1010 | 4.0 | 0100 | 36.75 | 39.075 | 39.775 |
| 11 | 1.450 | 18.400 | 116 | 41.3 | 10 | 1010 | 6.0 | 0110 | 36.80 | 39.125 | 39.925 |
| 12 | 1.475 | 18.425 | 118 | 41.4 | 10 | 1010 | 8.0 | 1000 | 36.85 | 39.175 | 39.875 |
| 13 | 1.500 | 18.450 | 120 | 41.6 | 11 | 1011 | 0.0 | 0000 | 36.90 | 39.225 | 39.925 |
| 14 | 1.525 | 18.475 | 122 | 41.7 | 11 | 1011 | 2.0 | 0010 | 36.95 | 39.275 | 39.975 |

In accordance with exemplary embodiments, the $F_{LO/2}$ output frequencies of the LO/2 channels are multiplied by two to create 14 channels of frequencies separated by 50 MHz steps. In the above table, $F_{RF\ FWD}$ and $F_{FR\ REV}$ constitute exemplary forward and reverse frequencies for given $F_{LO/2}$ frequencies which have been doubled to form local oscillator frequencies $F_{LO}$, and for modem intermediate frequencies of $F_{IF}$=2.325 and $F_{IP\ HIGH}$=3.025. Note that the frequencies $F_{RF\ FWD}$ and $F_{FR\ REV}$ are within the frequency band of interest, and are stepped across the 14 channels in increments of 50 MHz.

Exemplary parameters for a phase lock loop, such as the phase locked loop chip 604 of FIG. 1, used to achieve operation within the frequency band of interest specified in the foregoing table, are as follows:

| | | | |
|---|---|---|---|
| $K_p$ = | 0.302 | volts/rad | $F(s) = (1 + {}_sT2)/{}_sT1$ |
| $K_v$ = | 3.896e + 08 | rad/(sec volt) | Second Order Type II PLL Loop Filter Transfer Function |
| N = | 120 | | |
| $f_n$ = | 30.55 | Natural Freq (KHz) | |
| δ = | 2.06 | | |
| C = | 0.0100 | μf | |
| Fref = | 12.5 | MHz | |
| $\omega_n$ = | 191980.81 | rad/sec | |
| R1 = | 2660.0 | | |
| R2 = | 2150.0 | | |
| T1 = | 2.66E-05 | | |
| T2 = | 2.15E-05 | | |
| $\omega_{3dB}$ = | 838790.5 | | |
| $f_{3dB}$ = | 33.5 | Closed Loop 3 dB Freq (kHz) | |
| Fout = | 1500 | MHz | |

wherein $K_p$ is the phase detector constant of the divider 610, $K_v$ is the VCO constant of VCO 618, N is the loop divide ratio of divider 610, $f_n$ is the natural frequency of the loop which includes divider 610, δ is the loop damping factor for the loop which includes divider 610, C is the loop capacitance, $F_{ref}$ is the reference frequency of the output of divider 606 used as a reference with respect to the output from divider 610, $\omega_n$ is the natural frequency $f_n$ of the loop in radians, R1/R2 are loop resistances, T1/T2 are loop time constraints, ($\omega_{3dB}$/$f_{3dB}$ are the closed loop 3 dB bandwidth in radians/kilohertz, and $F_{out}$ is the radio frequency output of the loop (i.e., 618). A transient response frequency step is represented, for example, by a phase offset of zero degrees, and a 12.5 MHz frequency step. Of course, all of the foregoing values are by way of example only, and variations for any given application will be apparent by those skilled in the art.

In alternate embodiments, a desired channel step size can be attained by, for example, adding a mixer to the phase locked loop feedback path and then altering the divide ratios of dividers 606 and/or 610 accordingly. In addition, or alternately, a fractional-N divider can be used in the phase locked loop to alter the channel spacing.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. Apparatus for generating a signal having low-phase noise, said apparatus comprising:

a frequency reference oscillator;

a frequency divider coupled to said frequency reference oscillator;

a voltage controlled oscillator coupled to said frequency divider and phase locked to a frequency based upon said frequency reference oscillator; and an up-converter coupled to said voltage controlled oscillator, wherein a divide ratio of said frequency divider being selected to produce multiple exciter output frequencies of at least 18 GHz with an integrated phase noise of no greater than −40 dBc.

2. Apparatus according to claim 1, further comprising:

a pulse former coupled to said frequency reference oscillator for producing a pulsed output.

3. Apparatus according to claim 2, wherein said multiple exciter output frequencies are separated from one another by 25 MHz.

4. Apparatus according to claim 1, wherein said multiple exciter output frequencies are separated from one another by at least one MHz.

5. An apparatus for generating a communication band signal with reduced phase noise comprising:

a frequency reference oscillator for generating a reference frequency;

a voltage controlled oscillator for generating a synthesized output frequency based upon the reference frequency;

a phase locked oscillator for generating an up-conversion frequency based upon the reference frequency;

a first mixer for mixing the synthesized output frequency and the up-conversion frequency to generate a frequency output; and means for producing multiple frequency outputs of at least 18 GHz with an integrated phase noise of no greater than −40 dBc.

6. Apparatus according to claim 5, wherein said reference frequency is 50 MHz and the synthesized output frequency is 1.2 to 1.525 GHz.

7. Apparatus according to claim 5, wherein said frequency outputs are 18.15 to 18.475 GHz, and supplied over 14 channels with 25 MHz spacing.

8. Apparatus according to claim 5, wherein a power level of said frequency outputs are approximately 10 to 16 dB.

9. The apparatus according to claim 5, comprising:

a coupler connected to an output of the voltage controlled oscillator;

a feedback path frequency divider connected to the coupler;

a multiplexer connected to the feedback path frequency divider; and an integrator connected between the multiplexer and an input of the voltage controlled oscillator.

10. The apparatus according to claim 9, comprising:

a reference frequency divider connected between the frequency reference oscillator and the multiplexer.

11. The apparatus according to claim 9, wherein the integrator is an operational amplifier.

12. The apparatus according to claim 11, wherein an output of the operational amplifier is couple to an input of the operational amplifier through a resistor and a capacitor.

13. An apparatus for generating a communication band signal with reduced phase noise comprising:

a frequency reference oscillator for generating a reference frequency;

a first voltage controlled oscillator for generating a first synthesized output frequency based upon the reference frequency;

a second voltage controlled oscillator for generating a second synthesized output frequency based upon the reference frequency;

a first mixer for mixing the second synthesized output frequency and an up-conversion frequency based upon the first synthesized output frequency to create a frequency output; and means for producing multiple frequency outputs.

14. Apparatus according to claim 13, wherein said reference frequency is 30 MHz.

15. The apparatus according to claim 13, comprising:

a pulse former using the first synthesized output frequency for generating a pulsed intermediate frequency;

a multiplier for multiplying the frequency output to create a multiplied frequency output; and a mixer for mixing the multiplied frequency output and the pulsed intermediate frequency.

16. The apparatus according to claim 13, comprising:

a multiplier for multiplying a frequency output to create a multiplied frequency output; and a mixer for mixing the multiplied frequency output and a received signal.

17. The apparatus according to claim 13, comprising:

a coupler connected to an output of the second voltage controlled oscillator;

a feedback path frequency divider coupled to the coupler;

a multiplexer coupled to the feedback path frequency divider; and an integrator coupled between the multiplexer and an input of the second voltage controlled oscillator.

18. The apparatus according to claim 17, comprising:

a reference frequency divider coupled between the frequency reference oscillator and the multiplexer.

19. The apparatus according to claim 18, wherein a divide ratio of at least one of the reference frequency divider and the feedback path divider being selected to provide a channel step size of the frequency outputs.

20. A method for generating a communication band signal with reduced phase noise comprising:

generating a reference frequency from a frequency reference oscillator;

generating a synthesized output frequency based upon the reference frequency with a voltage controlled oscillator in a phase locked loop;

generating an up-conversion frequency based upon the reference frequency;

mixing the synthesized output frequency and the up-conversion frequency to generate a frequency output; and producing multiple frequency outputs of at least 18 GHz with an integrated phase noise of no greater than −40 dBc.

21. The method of claim 20, wherein producing multiple frequency outputs includes selecting divide ratios for a frequency divider in a feedback path of the phase locked loop.

22. A method for generating a communication band signal with reduced phase noise comprising:

generating a reference frequency;

generating a first synthesized output frequency based upon the reference frequency;

generating a second synthesized output frequency based upon the reference frequency with a voltage controlled oscillator in a phase locked loop;

mixing the second synthesized output frequency and an up-conversion frequency based upon the first synthesized output frequency to create a frequency output of at least 15 GHz; and selecting divide ratios for a frequency divider in a feedback path of the phase locked loop to produce multiple frequency outputs.

23. The method according to claim 22, comprising:

generating a pulsed intermediate frequency using the first synthesized output frequency;

multiplying the frequency output to create a multiplied frequency output; and mixing the multiplied frequency output and the pulsed intermediate frequency.

24. The method according to claim 22, comprising:

multiplying a frequency output to create a multiplied frequency output; and mixing the multiplied frequency output and a received signal.

* * * * *